US008380625B2

(12) United States Patent
Hoyos et al.

(10) Patent No.: US 8,380,625 B2
(45) Date of Patent: Feb. 19, 2013

(54) USE OF CONSTRAINTS TO ENFORCE COMPLEX PAYMENT POLICIES

(75) Inventors: Carlos Hoyos, Campinas (BR); Marcelo Perazolo, Cary, NC (US); Viswanath Srikanth, Chapel Hill, NC (US); Woodward S. Aichner, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1086 days.

(21) Appl. No.: 11/966,669

(22) Filed: Dec. 28, 2007

(65) Prior Publication Data

US 2009/0171683 A1    Jul. 2, 2009

(51) Int. Cl.
*G06Q 40/00* (2012.01)
(52) U.S. Cl. .......... 705/40; 705/35; 705/37; 705/14.22; 705/1.1; 705/24
(58) Field of Classification Search .............. 705/1.35, 705/40, 1.1, 37, 24, 14.22; 709/201, 219, 709/208, 224; 235/375, 482, 468
See application file for complete search history.

(56) References Cited

U.S. PATENT DOCUMENTS

| | | | | |
|---|---|---|---|---|
| 6,332,129 | B1 * | 12/2001 | Walker et al. | 705/80 |
| 7,389,294 | B2 * | 6/2008 | Kotas et al. | 707/781 |
| 7,584,152 | B2 * | 9/2009 | Gupta et al. | 705/65 |
| 2002/0143662 | A1 | 10/2002 | Clark et al. | |
| 2003/0040976 | A1 * | 2/2003 | Adler et al. | 705/26 |
| 2003/0130931 | A1 * | 7/2003 | Mirlas et al. | 705/37 |

(Continued)

FOREIGN PATENT DOCUMENTS

| KR | 20020021488 A | 3/2002 |
|---|---|---|
| KR | 20050001845 A | 1/2005 |

(Continued)

OTHER PUBLICATIONS

Frank J. Derfler Jr., E-Procurement & B2B Marketplaces: Smart Business Buying. (Industry Trend or Event), PC Magazine, 175, Jul. 1, 2000.*

(Continued)

*Primary Examiner* — John H Holly
(74) *Attorney, Agent, or Firm* — Steven L. Nichols; VanCott, Bagley, Cornwall & McCarthy P.C.

(57) ABSTRACT

A method of using constrained payments to enforce complex payment policies in electronic commerce (e-commerce) systems. An order capture component generates at least a first relationship object that corresponds to a first payment constraint rule. If an order item is placed in a shopping cart, and if the order item is associated with one or more payment constraint rules, and if one or more pre-conditions corresponding to the one or more payment constraint rules are satisfied, then the order capture component implements the one or more payment constraint rules. If one or more post-conditions corresponding to the one or more payment constraint rules are satisfied, then the order capture component submits a purchasing order from the shopping cart that includes the order item, such that the order item is constrained by the one or more payment constraint rules.

25 Claims, 7 Drawing Sheets

U.S. PATENT DOCUMENTS

| | | | |
|---|---|---|---|
| 2004/0139016 A1* | 7/2004 | Forzley | 705/40 |
| 2006/0224464 A1* | 10/2006 | Walker et al. | 705/26 |
| 2007/0083433 A1 | 4/2007 | Lawe | |
| 2007/0250443 A1 | 10/2007 | Hoyos et al. | |
| 2007/0271156 A1 | 11/2007 | Sarusi et al. | |

FOREIGN PATENT DOCUMENTS

| | | |
|---|---|---|
| KR | 20060100010 A | 9/2006 |

OTHER PUBLICATIONS

UK Patent Office Search Report, App. No. GB0818219.8, Oct. 24, 2008.

Roussos G: "Enabling RFID in Retail".Computer. IEEE Service Center. Los Alamitos. CA. US. 1-9; vol. 39. No. 3. Mar. 1, 2006.pp. 25-30.

* cited by examiner

USE OF CONSTRAINTS TO ENFORCE COMPLEX PAYMENT POLICIES

BACKGROUND OF THE INVENTION

The present invention relates in general to data processing systems and in particular to electronic commerce (e-commerce) systems.

BRIEF SUMMARY OF THE INVENTION

Disclosed are a method, system, and computer program product for using payment constraints to enforce complex payment policies in electronic commerce (e-commerce) systems. An order capture component generates at least a first relationship object that corresponds to a first payment constraint rule. If an order item is placed in a shopping cart, and if the order item is associated with one or more payment constraint rules, and if one or more pre-conditions corresponding to the one or more payment constraint rules are satisfied, then the order capture component implements the one or more payment constraint rules. If one or more post-conditions corresponding to the one or more payment constraint rules are satisfied, the order capture component submits an order from the shopping cart that includes the order item.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java® (Java is a trademark or registered trademark of Sun Microsystems, Inc. in the United States and other countries), Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
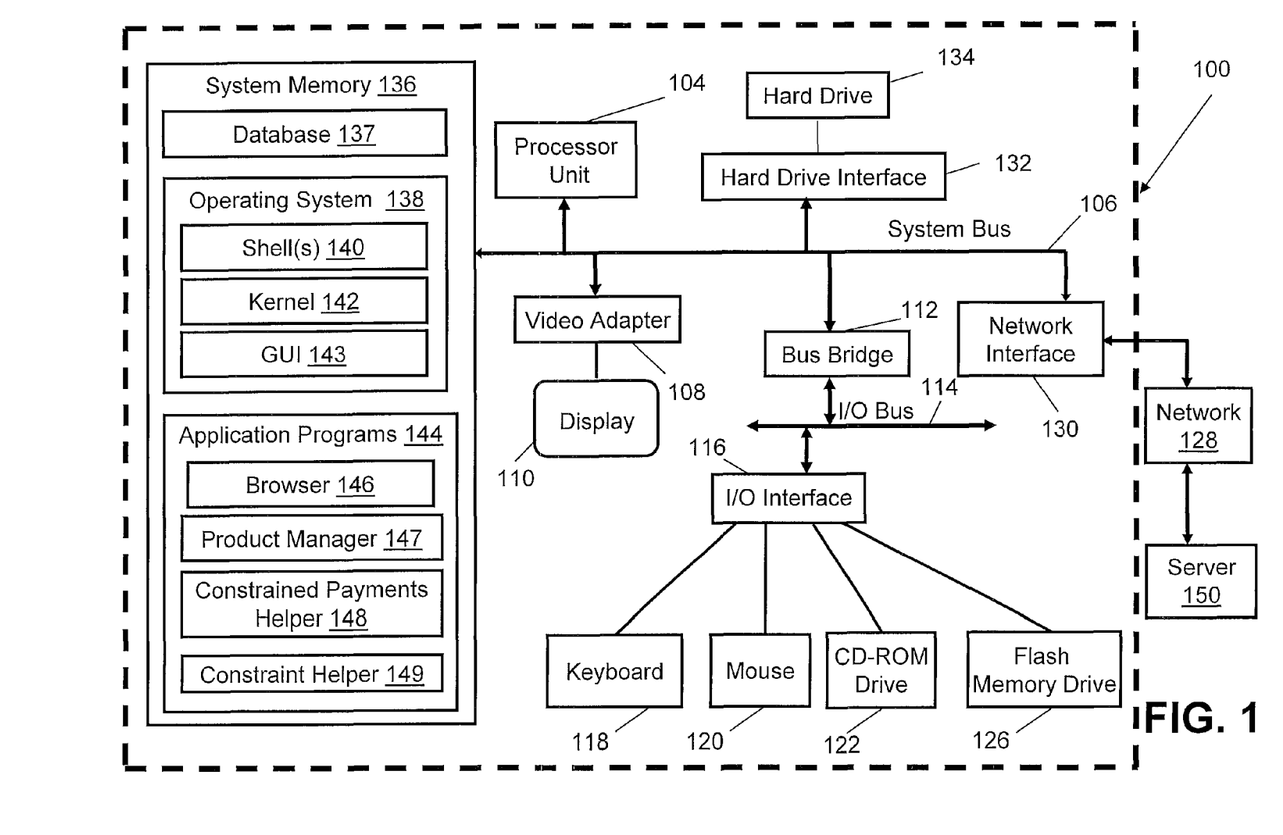
FIG. 1 depicts a high level block diagram of an exemplary computer, according to an embodiment of the present invention.

With reference now to FIG. 1, there is depicted a block diagram of an exemplary computer 100, with which the present invention may be utilized. Computer 100 includes processor unit 104 that is coupled to system bus 106. Video adapter 108, which drives/supports display 110, is also coupled to system bus 106. System bus 106 is coupled via bus bridge 112 to Input/Output (I/O) bus 114. P/O interface 116 is coupled to I/O bus 114. I/O interface 116 affords communication with various I/O devices, including keyboard 118, mouse 120, Compact Disk-Read Only Memory (CD-ROM) drive 122, and flash memory drive 126. The format of the ports connected to I/O interface 116 may be any known to those skilled in the art of computer architecture, including but not limited to Universal Serial Bus (USB) ports.

Computer 100 is able to communicate with server 150 via network 128 using network interface 130, which is coupled to system bus 106. Network 128 may be an external network such as the Internet, or an internal network such as a Local Area Network (LAN), an Ethernet, or a Virtual Private Network (VPN). In one embodiment, server 150 is configured similarly to computer 100.

Hard drive interface 132 is also coupled to system bus 106. Hard drive interface 132 interfaces with hard drive 134. In one embodiment, hard drive 134 populates system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Data that populates system memory 136 includes Operating System (OS) 138, application programs 144, and database 137. Database 137 includes information corresponding to one or more electronic commerce (e-commerce) orders. In one embodiment, database 137 may include an electronic shopping cart. In one embodiment, database 137 may be stored in server 150 or on an external storage device, such as flash memory drive 126.

OS 138 includes shell 140, for providing transparent user access to resources such as application programs 144. Generally, shell 140 is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes graphical user interface (GUI) 143 and kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include browser 146, product manager 147, constrained payments helper 148, and constraint helper 149. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Product manager 147, constrained payments helper 148, and constraint helper 149 are utilized in the performance of the functions, processes and methods illustrated below in FIGS. 2-7.

In one embodiment, computer 100 is able to download product manager 147, constrained payments helper 148, and constraint helper 149 from a service provider (which utilizes, e.g., server 150), preferably in an "on demand" basis. Furthermore, service provider server 150 is able to execute the code found in product manager 147, constrained payments helper 148, and constraint helper 149, thus conserving the processing resources of computer 100.

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention. Note that the hardware architecture for service provider server 150 may be substantially similar to that shown for computer 100.

Figure 2A:
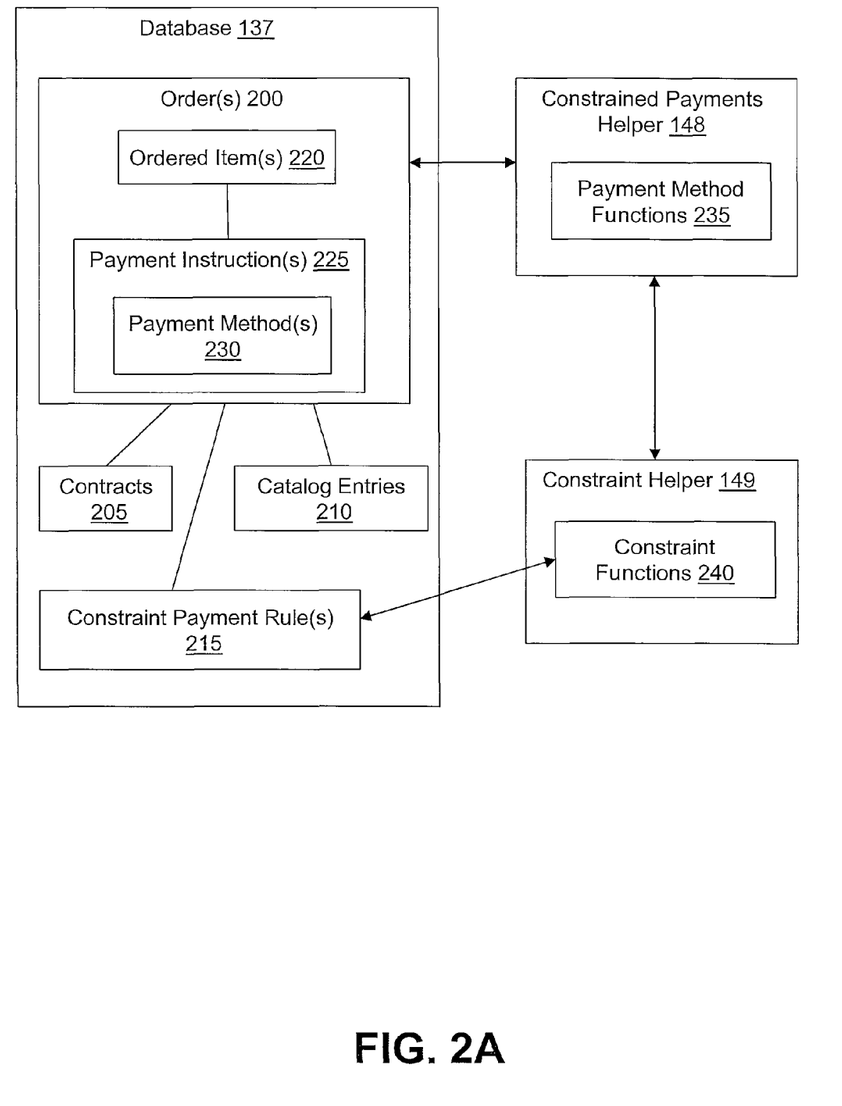
FIG. 2A illustrates an exemplary payment database and attendant constraint and payment helpers, according to an embodiment of the present invention.

With reference now to FIG. 2A, there is depicted an exemplary database 137 (also shown in FIG. 1). In one embodiment, database 137 includes an order file 200, which includes one or more orders and their associated payment instructions 225 for ordered items 220. Associated with order file 200 are files related to contracts 205, catalog entries 210, and constraint payment rules 215. Contracts 205 describe any contractual agreement between a buyer and seller of the ordered items 220, and may include the legal support for an agreement as to how an order is filled, including how the order is paid for, delivered, etc. Catalog entries 210 describe items in a catalog, including item numbers, descriptions, availability, etc. that may be found in the order file 200.

Payment constraint rules 215 is a relationship object that defines a dependency relationship between a payment method (e.g., payment methods 230) and an order item (e.g., ordered items 220) in an e-commerce system. In one embodiment, relationship objects are rule-based elements that specify and/or filter one or more corresponding attributes that an e-commerce system uses in the selection of order artifacts and/or payment methods. For example, if a user of an e-commerce system selects a first item that is associated with a first payment constraint rule corresponding to a price discount (e.g., a sale or coupon), then the purchase price of the first item may be automatically adjusted if the item is selected for purchase (i.e., added to a shopping cart). Similarly, if a user selects a second item that is associated with a second payment constraint rule corresponding to a financing option, then the purchase price of the second item may be automatically adjusted to include a pre-defined amount paid from a user-defined account and/or a pre-defined amount paid over time in the form of a lease.

Figure 2B:
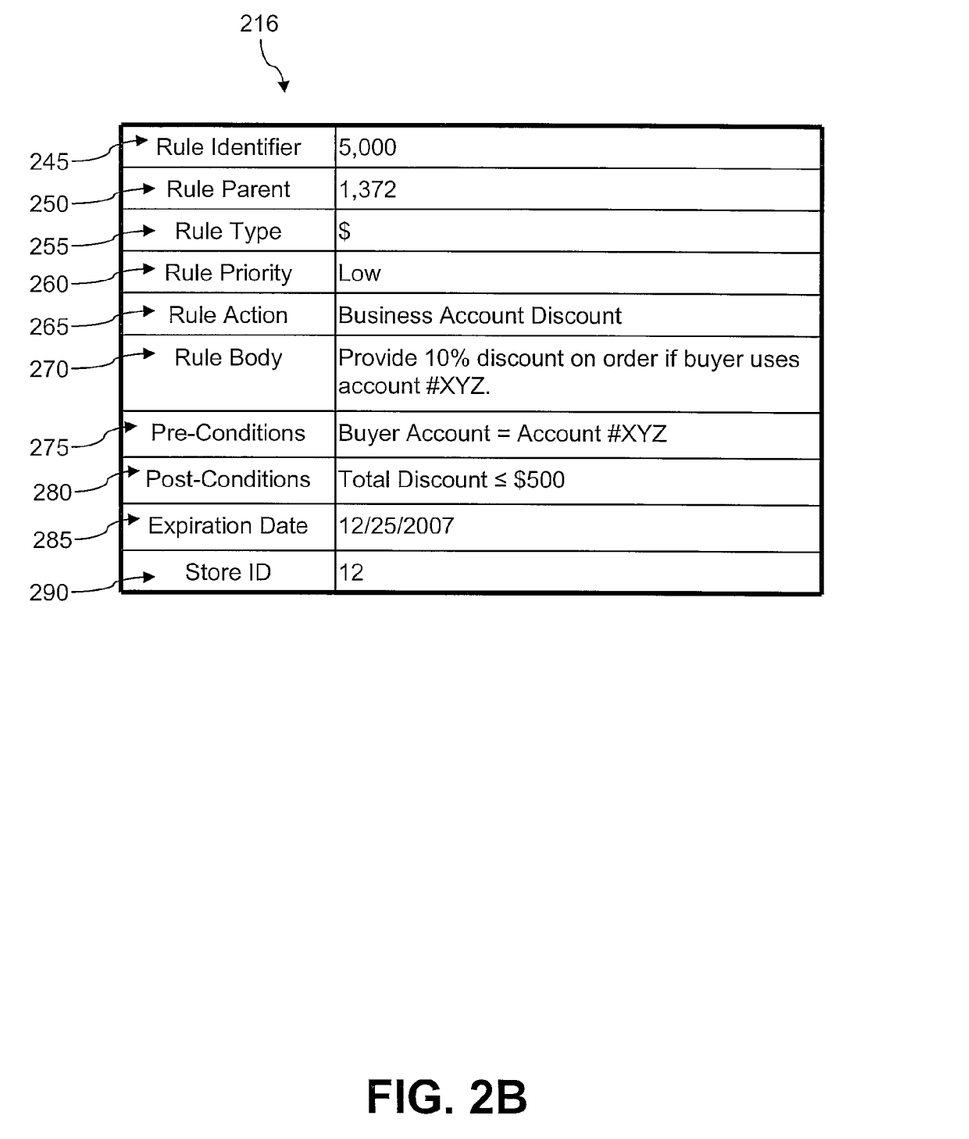
FIG. 2B depicts an exemplary constraint rule that may be used when processing an order payment.

Additional detail of an exemplary constraint rule from constraint payment rules 215 is depicted in FIG. 2B as constraint rule 216. Constraint rule 216 includes a rule identifier 245, which is any type of identifier for a constraint rule. In the example shown, constraint rule 216 is rule number 5000, and is a child of rule parent number 1,372 (element 250). That is, rule parent number 1,372 defines a general constraint rule for how an order must be purchased, and constraint rule 216 (identified by rule identifier 245 as rule number 5000) further refines/amends details of how the order is to be paid for. As indicated by field 255, constraint rule 216 is a monetary ("$") rule of low priority (field 260). Exemplary priority levels include low, medium and high. As described by field 265, the constraint rule 216 invokes a rule action of providing a business account monetary discount, which, according to field 270, provides a ten percent discount on an order if the buyer uses a particular customer account ("XYZ"). Thus, in order to qualify for this discount, the buyer must use account "XYZ" (as stated in field 275 as a pre-condition for constraint rule 216 to take effect). Furthermore, there is a post-condition (see field 280) requirement that the total discount not exceed $500, no matter how large the order is. As indicated in fields 285 and 290, the constraint rule 216 (and thus the discount offer) are only in effect until Dec. 25, 2007, and only at Store #12.

Returning now back to FIG. 2A, how a specific order from orders 200 is paid for is defined in payment instructions 225, which includes the specific payment method 230 for that specific order. To define and utilize the payment method 230, the constrained payments helper 148 and constraint helper 149 are called.

Constrained payments helper 148, along with payment method functions 235, sets up constraint rules in an integrated manner. That is, constrained payments helper 148 selects a payment method function template from payment method functions 235 for a particular order, vendor and/or customer. The constrained payments helper 148 sets up the constraint function by establishing any pre-conditions (e.g., the buyer must use a particular buyer account), post-conditions (e.g., the maximum discount for any order is $500), expiration dates, interfaces needed for the constraint helper 149 to use to call a particular constraint rule, etc.

Constraint helper 149 is a software object that includes constraint functions 240. Constraint functions 240 describe how a particular constraint rule (e.g., from constraint payment rules 215) is called, evaluated, etc. For example, consider constraint rule 216 shown in FIG. 2B. Constraint function 240 may include logic for determining when constraint rule 216 is called. This logic may be dependent on the identity of the ordering customer, a geographic or time period, a real-time availability of an ordered product, etc. Constraint functions 240 also determine what type of constraint rule is being called (e.g., a discount, free shipping, a rebate, a future-use coupon, etc.), in order to properly process the called constraint rule.

Once constraint functions 240 determine which constraint rule is to be called, then constraint functions 240 determine if additional conditions required to use that constraint rule have been met. Continuing with the example constraint rule 216 shown in FIG. 2B, constraint functions 240 may determine if the buyer is in fact using Account # XYZ, that the expiration date has not transpired, etc. When the constraint function 240 determines that all pre and post conditions have been met, then the constraint function 240 calls any other software needed to utilize the particular constraint rule. Examples of such software includes calls to tables, subroutines (or other processing software objects), databases, registers and/or any other software and/or data needed to implement the selected constraint rule.

Figure 3:
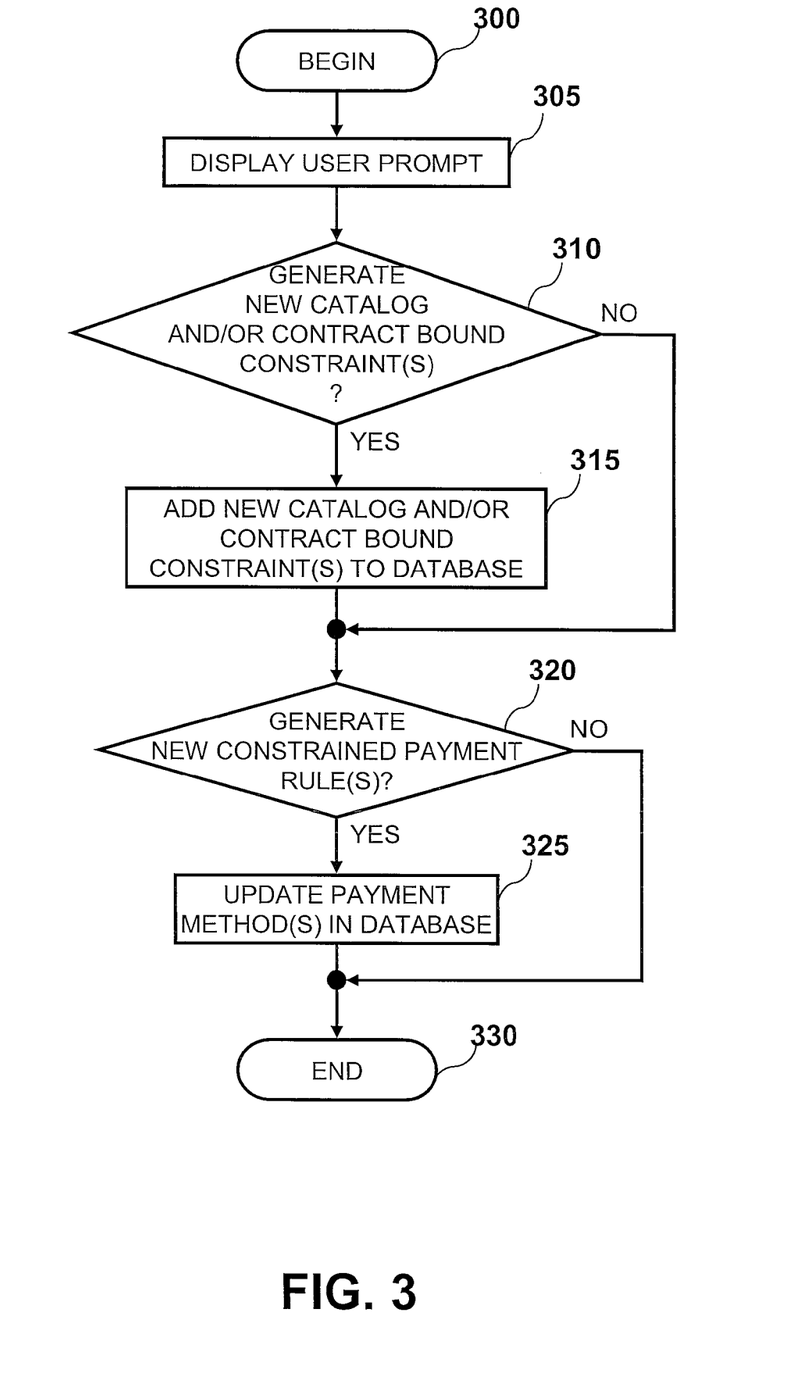
FIG. 3 is a high level logical flowchart of an exemplary method of generating new constraint rules.

With reference now to FIG. 3, a high level flow chart of exemplary steps taken to generate a constraint rule is presented. After initiator block 300, a user prompt is displayed on a computer (block 305). This user prompt invites a seller to generate a new catalog and/or contract bound constraints (query block 310). As described in block 315, the seller (or a third party service) may create a new catalog, or a new item in an existing catalog, showing products that are offered for sale in an e-commerce environment. The seller may also associate payment constraint rules (e.g., constraint payment rules 215 described above in FIG. 2A) with the newly added items and/or catalog, and store these newly created/defined payment constraint rules in a database. If such rules have been created (query block 320), in a manner such as that described above with reference to FIG. 2A, then the payment constraint rule database is updated (block 325), and the process ends (terminator block 330).

Figure 4:
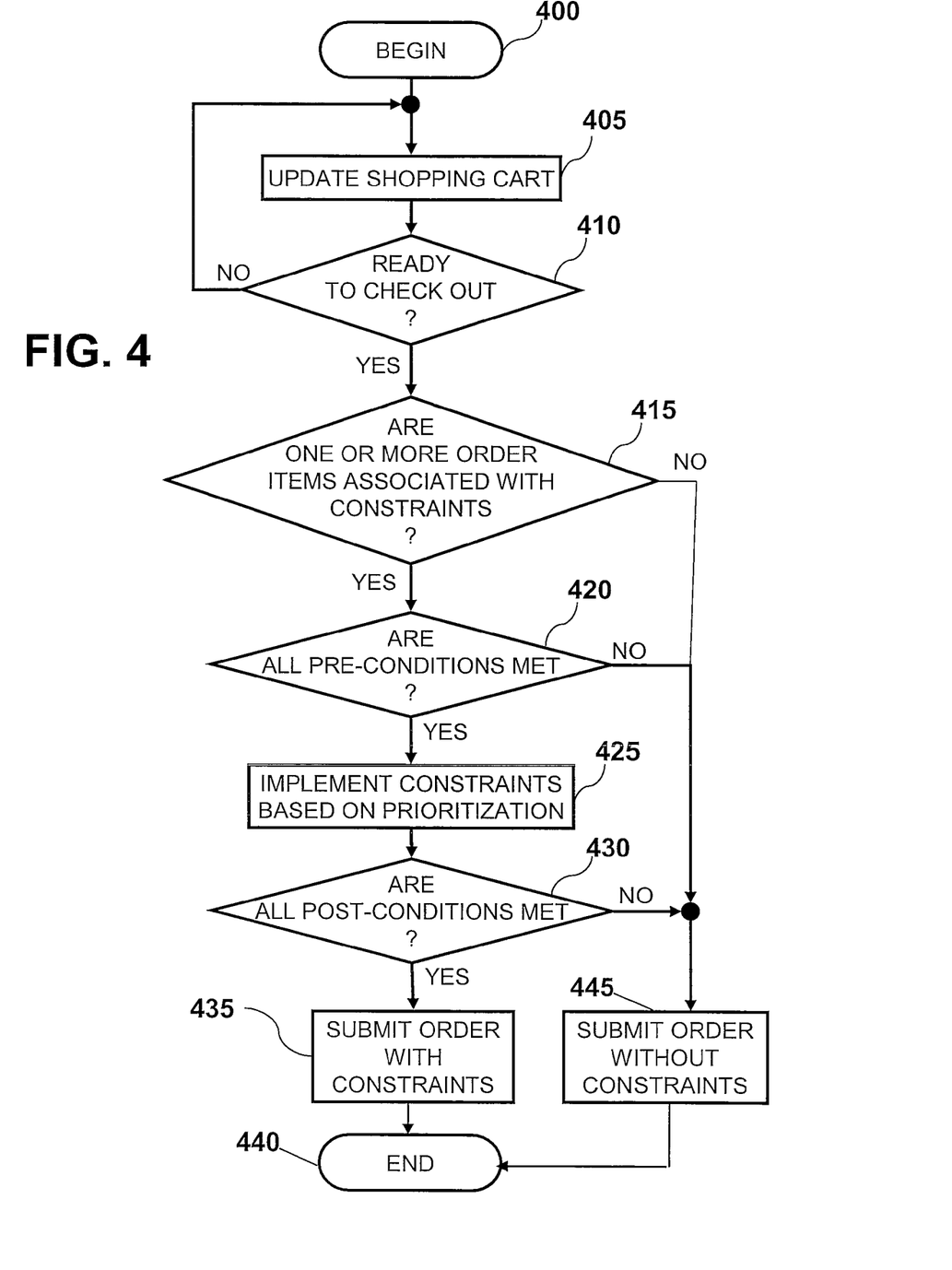
FIG. 4 is a high level logical flowchart of an exemplary method of using payment constraint rules to enforce complex payment policies.

With reference now to FIG. 4, a high level flow chart of exemplary steps taken to utilize a payment constraint rule is presented. Initiator block 400 may be prompted by a user of computer 100 (FIG. 1) using browser 146 to access an e-commerce system that includes one or more items that are associated with (i.e., trigger) one or more pre-defined payment constraint rules. A user may search for available items using catalog utility 148 (FIG. 1) and place items in a virtual shopping cart, such as database 137 (also shown in FIG. 1), which is updated (block 405). If the shopper is ready to check out (query block 410), an order capture component, such as product manager 147 (FIG. 1), generates relationship objects and/or payment constraint rules within database 137, as depicted in block 415. That is, product manager 147 automatically generates relationship objects and payment constraint rules that correspond to items within database 137 (i.e., items placed in a shopping cart) when the user is ready to check out (or, alternatively, every time a user places an item that corresponds to pre-defined payment constraint rule within the shopping cart). If all pre-conditions of the payment constraint rule associated with each item in the shopping basket have been met (query block 420), then the appropriate payment constraint rules are applied in a priority manner (block 425). That is, as described above with reference to field 260 in exemplary constraint rule 216 in FIG. 2B, different payment constraint rules have different priority levels (e.g., low, medium, high). If multiple payment constraint rules apply to a same product for a same buyer at a same time, then the payment constraint rule having the higher/highest priority will be implemented. If all applicable payment constraint rules have a same priority, then a particular payment constraint rule is selected randomly, or according to which one offers the buyer the greatest savings, or according to which constraint rule gives the seller the highest profit, etc.

As represented in block 435, once the appropriate payment constraint rule is applied to the order item(s), the order is submitted and processed (e.g., billed, shipped, etc.), and the process ends (terminator block 440).

Returning to query blocks 415, 420 and 430, if any of these queries results in "NO," (i.e., no orders are associated with the constraints (415), pre-conditions for constrained ordering have not been met (420), and/or all post-conditions for constrained ordering have not been met (430)), then the order is processed without any of the constraints described above.

Figure 5:
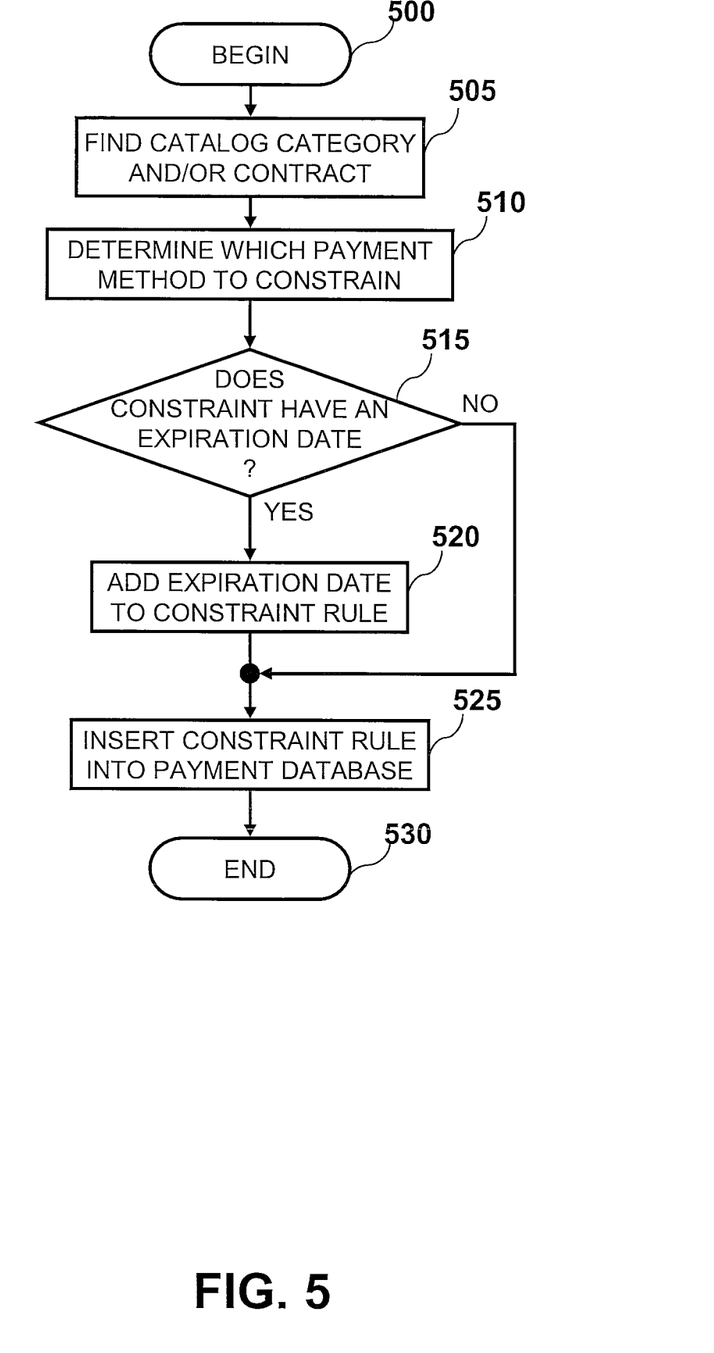
FIG. 5 is a high level logical flowchart of an exemplary method of adding a payment constraint rule to a payment database.

With reference now to FIG. 5, there is illustrated a high level logical flowchart of an exemplary method of adding a payment constraint rule to database 137 (see FIG. 1), according to an embodiment of the invention. The process begins at block 500 in response to a user of computer 100 (FIG. 1) selecting an option to define a catalog-bound and/or contract-bound payment constraint rule. Product manager 147 (FIG. 1) searches for a catalog category and/or a contract within database 137 that corresponds to the purpose of the new payment constraint rule, as depicted in block 505. Product manager 147 may use information in constraint helper 149 (FIG. 2A)

to locate a catalog category and/or contract with a purpose and/or subject area that corresponds to the new payment constraint rule, as shown in block 510.

At block 515, product manager 147 (FIG. 1) determines whether or not a user has provided an expiration data for the new payment constraint rule. If the payment constraint rule does not have an expiration date, the process proceeds to block 525. If the user has provided an expiration date (e.g., if a sale will be valid for 30 days), product manager 147 (FIG. 1) adds the expiration date to the payment constraint rule, as depicted in block 520. Product manager 147 inserts (i.e., saves) the new payment constraint rule in database 137, as shown in block 525, and the process terminates at block 530.

Figure 6:
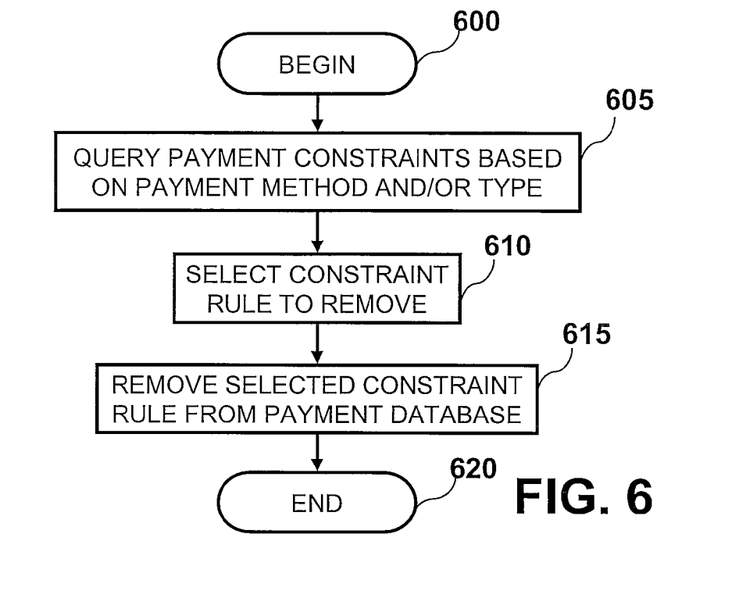
FIG. 6 is a high level logical flowchart of an exemplary method of removing a payment constraint rule from a payment database.

With reference now to FIG. 6, there is illustrated a high level logical flowchart of an exemplary method of removing a payment constraint rule from database 137 (FIGS. 1 and 2A), according to an embodiment of the invention. The process begins at block 600 in response to a user of computer 100 (FIG. 1) selecting an option to remove a catalog-bound and/or contract-bound payment constraint rule. Product manager 147 (FIG. 1) queries database 137 to locate one or more payment constraint rules based on payment method and/or payment type, as depicted in block 605. Product manager 147 uses GUI 143 (FIG. 1) to prompt a user to select a payment constraint rule to be removed from database 137, as shown in block 610. Product manager 147 removes the selected payment constraint rule from database 137, as depicted in block 615, and the process terminates at block 620.

Figure 7:
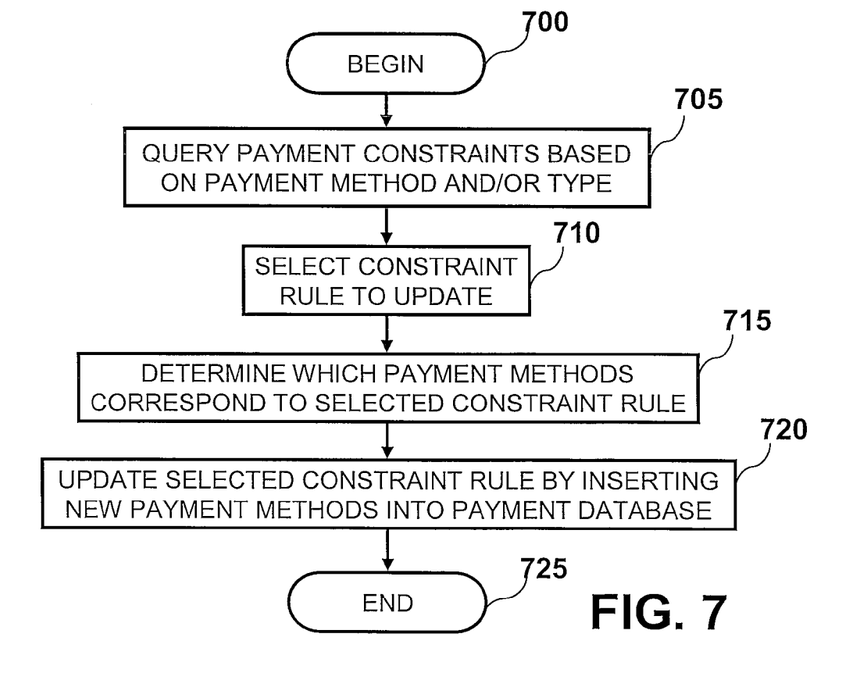
FIG. 7 is a high level logical flowchart of an exemplary method of updating a payment constraint rule in a payment database.

Turning now to FIG. 7, there is illustrated a high level logical flowchart of an exemplary method of updating a payment constraint rule in database 139 (FIG. 1), according to an embodiment of the invention. The process begins at block 700 in response to a user of computer 100 (FIG. 1) selecting an option to update a catalog-bound and/or contract-bound payment constraint rule. Product manager 147 (FIG. 1) queries database 137 to locate one or more payment constraint rules based on payment method and/or payment type, as depicted in block 705. Product manager 147 uses GUI 143 (FIG. 1) to prompt a user to select a payment constraint rule to be updated within database 137, as shown in block 710. Product manager 147 locates one or more payment methods within database 137 that correspond to the selected payment constraint rule, as depicted in block 715. Product manager 147 updates the selected payment constraint rule by inserting one or more new and/or updated payment methods into database 139, as depicted in block 720, and the process terminates at block 725.

One embodiment of the present invention thus provides a method of using constrained payments to enforce complex payment policies. An order capture component, such as product manager 147 (FIG. 1), generates at least a first relationship object that corresponds to a first payment constraint rule. If an order item is placed in a shopping cart, such as database 137 (FIG. 1), the order item is associated with one or more payment constraint rules, and one or more pre-conditions corresponding to the one or more payment constraint rules are satisfied, the order capture component implements the one or more payment constraint rules. If one or more post-conditions corresponding to the one or more payment constraint rules are satisfied, the order capture component submits a purchasing order from the shopping cart that includes the order item.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for defining and enforcing payment constraint rules in an electronic commerce (e-commerce) system implemented by at least one processor, the method comprising:
   in response to a determination by said e-commerce system that an order item has been placed in a shopping cart, that said order item has been associated with one or more payment constraint rules, and that one or more pre-conditions corresponding to said one or more payment constraint rules has been satisfied, implementing said one or more payment constraint rules with said e-commerce system, wherein said payment constraints rule is a relationship object that defines a dependency relationship between a payment method and a particular order item; and
   in response to a determination by said e-commerce system that one or more post-conditions corresponding to said one or more payment constraint rules has been satisfied, submitting with said e-commerce system a purchasing order from said shopping cart that includes said order item, wherein said order item is constrained by said one or more payment constraint rules.

2. The method of claim 1, wherein said shopping cart further comprises a temporary storage location.

3. The method of claim 1, further comprising:
locating a catalog category that corresponds to a second payment constraint rule with said e-commerce system;
in response to a determination that said second payment constraint rule is associated with an expiration date, adding said expiration date to said second payment constraint rule with said e-commerce system; and
inserting said second payment constraint rule into a payment database with said e-commerce system.

4. The method of claim 3, wherein the first payment constraint rule and the second payment constraint rule are a same constraint rule.

5. The method of claim 1, further comprising:
searching for a payment constraint rule in a payment database with said e-commerce system;
selecting with said c-commerce system one of a plurality of payment constraint rules for removal from said payment database; and
removing said selected payment constraint rule from said payment database with said e-commerce system.

6. The method of claim 1, further comprising:
searching for a payment constraint rule in a payment database with said e-commerce system;
selecting one or more of a plurality of payment constraint rules for modification in said payment database with said e-commerce system; and
updating said selected payment constraint rule in said payment database by inserting one or more new payment methods into said payment database with said e-commerce system.

7. The method of claim 1, wherein, if multiple payment constraint rules are associated with said order item, implementing said payment constraint rules based on a priority associated with each of said multiple payment constraint rules.

8. The method of claim 7, further comprising implementing on that payment constraint rule having a highest priority among said multiple payment constraint rules.

9. The method of claim 7, wherein, if multiple payment constraint rules are associated with said order item and said multiple payment constraint rules have a same associated priority, selecting one of said payment constraint rules for implementation on one of the following bases: (1) randomly, (2) which payment constraint rule provides a greater savings for a buyer submitting said purchasing order, and (3) which payment constraint rule provides a great profit for a seller of said order item.

10. A computer system comprising:
a processor;
a data bus coupled to the processor;
a memory coupled to the data bus; and
a computer-usable medium embodying computer program code, the computer program code comprising instructions executable by the processor and configured for enforcing payment constraint rules in electronic commerce (e-commerce) by:
in response to a determination that an order item is placed in a shopping cart, said order item is associated with one or more payment constraint rules, and one or more pre-conditions corresponding to said one or more payment constraint rules are satisfied, implementing said one or more payment constraint rules, wherein said payment constraints rule is a relationship object that defines a dependency relationship between a payment method and a particular order item; and
in response to a determination that one or more post-conditions corresponding to said one or more payment constraint rules are satisfied, submitting a purchasing order from said shopping cart that includes said order item, wherein said order item is constrained by said one or more payment constraint rules.

11. The computer system of claim 10, wherein said shopping cart further comprises a temporary storage location.

12. The computer system of claim 10, wherein the instructions are further configured for:
searching for a payment constraint rule in a payment database;
selecting one of a plurality of payment constraint rules for removal from said payment database; and
removing said selected payment constraint rule from said payment database.

13. The computer system of claim 10, wherein the instructions are further configured for:
searching for a payment constraint rule in a payment database;
selecting one or more of a plurality of payment constraint rules for modification in said payment database; and
updating said selected payment constraint rule in said payment database by inserting one or more new payment methods into said payment database.

14. The computer system of claim 10, wherein the instructions are further configured for:
locating a catalog category that corresponds to a second payment constraint rule;
in response to a determination that said second payment constraint rule is associated with an expiration date, adding said expiration date to said second payment constraint rule; and
inserting said second payment constraint rule into a payment database.

15. The computer system of claim 14, wherein the first payment constraint rule and the second payment constraint rule are a same constraint rule.

16. A computer program product for enforcing payment constraint rules in an electronic commerce (e-commerce) system, the computer program product comprising:
a computer usable storage medium having compute usable program code embodied therewith, the computer usable program code comprising:
computer usable program code configured to implement said one or more payment constraint rules in response to a determination that an order item is placed in a shopping cart, said order item is associated with one or more payment constraint rules, and one or more pre-conditions corresponding to said one or more payment constraint rules are satisfied, wherein said payment constraints rule is a relationship object that defines a dependency relationship between a payment method and a particular order item; and
computer usable program code configured to submit a purchasing order from said shopping cart that includes said order item in response to a determination that one or more post-conditions corresponding to said one or more payment constraint rules are satisfied, wherein said order item is constrained by said one or more payment constraint rules.

17. The computer program product of claim 16, wherein the said shopping cart comprises a temporary storage location.

18. The computer program product of claim 16, wherein the computer usable program code further comprises:
   computer usable program code configured to locate a catalog category that corresponds to a second payment constraint rule;
   computer usable program code configured to, in response to a determination that said second payment constraint rule is associated with an expiration date, add said expiration date to said second payment constraint rule; and
   computer usable program code configured to insert said second payment constraint rule into a payment database.

19. The computer program product of claim 16, wherein the computer usable program code further comprises:
   computer usable program code configured to search for a payment constraint rule in a payment database;
   computer usable program code configured to select one of a plurality of payment constraint rules for removal from said payment database; and
   computer usable program code configured to remove said selected payment constraint rule from said payment database.

20. The computer program product of claim 16, wherein the computer usable program code further comprises:
   computer usable program code configured to search for a payment constraint rule in a payment database;
   computer usable program code configured to select one or more of a plurality of payment constraint rules for modification in said payment database; and
   computer usable program code configured to update said selected payment constraint rule in said payment database by inserting one or more new payment methods into said payment database.

21. A method for defining and enforcing payment constraint rules in an electronic commerce (e-commerce) system implemented by at least one processor, the method comprising:
   determining with said e-commerce system whether an order item has been placed in a shopping cart, whether said order item has been associated with one or more payment constraint rules, and whether one or more preconditions corresponding to said one or more payment constraint rules has been satisfied, wherein said payment constraints rule is a relationship object that defines a dependency relationship between a payment method and a particular order item;
   in response to a determination by said e-commerce system that an order item has been placed in a shopping cart, that said order item has been associated with one or more payment constraint rules, and that one or more preconditions corresponding to said one or more payment constraint rules has been satisfied, implementing said one or more payment constraint rules with said e-commerce system; and
   submitting with said e-commerce system a purchasing order for said order item, said purchasing order being submitted to a vendor of said order item, wherein said purchasing order is constrained by said one or more payment constraint rules.

22. The method of claim 21, further comprising determining with said e-commerce system that one or more postconditions corresponding to said one or more payment constraint rules has been satisfied prior to submitting said a purchasing order.

23. The method of claim 21, further comprising downloading a constrained payment helper from a service provider for execution by said processor in said e-commerce system.

24. The method of claim 21, wherein, if multiple payment constraint rules are associated with said order item, implementing said payment constraint rules based on a priority associated with each of said multiple payment constraint rules.

25. The method of claim 24, further comprising implementing on that payment constraint rule having a highest priority among said multiple payment constraint rules.

* * * * *